United States Patent
Bishop et al.

(10) Patent No.: US 9,885,888 B2
(45) Date of Patent: Feb. 6, 2018

(54) INTEGRATED MICROWAVE-TO-OPTICAL SINGLE-PHOTON TRANSDUCER WITH STRAIN-INDUCED ELECTRO-OPTIC MATERIAL

(71) Applicant: INTERNATIONAL BUSINESS MACHINES CORPORATION, Armonk, NY (US)

(72) Inventors: Lev S. Bishop, Dobbs Ferry, NY (US); Stefan Filipp, Zurich (CH); Jay M. Gambetta, Yorktown Heights, NY (US); Jason S. Orcutt, Katonah, NY (US); Hanhee Paik, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 15/018,288

(22) Filed: Feb. 8, 2016

(65) Prior Publication Data
US 2017/0227795 A1    Aug. 10, 2017

(51) Int. Cl.
| G02F 1/01 | (2006.01) |
| G02B 6/293 | (2006.01) |
| G06N 99/00 | (2010.01) |

(52) U.S. Cl.
CPC .......... *G02F 1/011* (2013.01); *G02B 6/29341* (2013.01); *G06N 99/002* (2013.01); *G02F 2203/15* (2013.01)

(58) Field of Classification Search
CPC .... G02B 6/29341; G02F 1/011; G06N 99/002
See application file for complete search history.

(56) References Cited

U.S. PATENT DOCUMENTS

| 6,815,708 B1 | 11/2004 | Iguchi | |
| 6,979,836 B2* | 12/2005 | Zagoskin | B82Y 10/00 257/31 |
| 7,050,212 B2* | 5/2006 | Matsko | H01S 3/0627 359/239 |
| 7,450,790 B1* | 11/2008 | Jalali | G01R 29/0885 385/12 |

(Continued)

FOREIGN PATENT DOCUMENTS

WO   2015127498   9/2015

OTHER PUBLICATIONS

C. Javerzac-Galy, On-chip microwave-to-optical quantum coherent converter based on a superconducting resonator coupled to an electro-optic microresonator, arXiv:1512.06442 [quant-ph], Dec. 20, 2015.

(Continued)

*Primary Examiner* — Daniel Petkovsek
(74) *Attorney, Agent, or Firm* — Tutunjian & Bitetto, P.C.; Vazken Alexanian (57) ABSTRACT

Transducers and methods of making the same include a substrate having a cavity with a diameter that supports whispering gallery modes at a frequency of an input signal. A focusing structure in the cavity focuses the electric field of the input signal. A resonator directly under the focusing structure has a crystalline structure that generates an electro-optic effect when exposed to electrical fields. An electric field of the input signal modulates an output signal in the resonator via the electro-optic effect.

9 Claims, 7 Drawing Sheets

(56) References Cited

U.S. PATENT DOCUMENTS

| | | | |
|---|---|---|---|
| 7,515,786 B1 * | 4/2009 | Matsko | G02B 6/29341 385/13 |
| 7,889,992 B1 | 2/2011 | DiVincenzo et al. | |
| 8,094,359 B1 * | 1/2012 | Matsko | G02F 1/0356 359/239 |
| 8,452,139 B1 * | 5/2013 | Matsko | B82Y 20/00 385/28 |
| 8,498,539 B1 * | 7/2013 | Ilchenko | H04B 10/90 398/115 |
| 8,514,400 B2 * | 8/2013 | Mohageg | G01C 19/72 356/459 |
| 8,670,807 B2 | 3/2014 | Rose et al. | |
| 8,849,075 B2 | 9/2014 | Painter et al. | |
| 9,260,289 B2 * | 2/2016 | Park | G02B 6/00 |
| 9,296,609 B2 * | 3/2016 | Park | B81B 3/0029 |
| 9,454,061 B1 * | 9/2016 | Abdo | G02B 26/002 |
| 2008/0310463 A1 | 12/2008 | Maleki et al. | |
| 2012/0039346 A1 | 2/2012 | Liang et al. | |
| 2012/0103099 A1 | 5/2012 | Stuke et al. | |
| 2013/0121633 A1 | 5/2013 | Painter et al. | |
| 2015/0060650 A1 | 3/2015 | Park et al. | |
| 2015/0060756 A1 | 3/2015 | Park | |

OTHER PUBLICATIONS

Patent Cooperation Treaty—"Notification of Transmittal of the International Search Report and the Written Opinion of the International Searching Authority, or the Declaration"—for International Patent Application No. PCT/IB2017/050179. dated May 8, 2017 (10 pages).

* cited by examiner

INTEGRATED MICROWAVE-TO-OPTICAL SINGLE-PHOTON TRANSDUCER WITH STRAIN-INDUCED ELECTRO-OPTIC MATERIAL

BACKGROUND

Technical Field

The present invention relates to conversion between a microwave and an optical domain and, more particularly, to a transducer to convert single-photon microwave signals to optical signals.

Description of the Related Art

Various communication protocols rely on optical fibers because of their low loss, high bandwidth, low background noise, and the ease of routing. Optical fibers can also be used for sending quantum information in the form of single photons or coherent states. On the other hand, many viable quantum processing architectures operate at microwave frequencies. The high amplitude stability of microwave structures allows precise controls on quantum bits (qubits) that enable high-fidelity gate operations. However, microwave photons are more difficult to use for long-range communication purposes, due to high thermal background noise and high loss when such signals propagate in waveguides.

Existing approaches to converting between microwave signals and optical signals are complicated, difficult to implement in solid state systems, or difficult to optimize. Some existing transducers use electro-optic crystalline optical resonators to perform microwave-to-optical conversion. One of the problems of using such resonators is that other coexisting non-linear properties, such as pyro-electricity and piezo-electricity, impede the microfabrication processes of the microwave resonator. Another problem is that microfabrication can likewise contaminate the crystalline electro-optic optical resonators and reduce the quality factor. These resonators also have a high microwave loss and are difficult to align at cryogenic temperatures.

SUMMARY

A transducer includes a substrate having a cavity with a diameter that supports whispering gallery modes at a frequency of an input signal. A focusing structure in the cavity focuses the electric field of the input signal. A resonator directly under the focusing structure has a crystalline structure that generates an electro-optic effect when exposed to electrical fields. An electric field of the input signal modulates an output signal in the resonator via the electro-optic effect.

A quantum computing device includes a qubit configured to provide a first signal at a first frequency. A transducer coupled to the qubit and includes a substrate having a cylindrical cavity with a diameter that supports whispering gallery modes at the first frequency. There is a central pin in the cavity. A resonator is positioned directly under the central pin. The resonator has a crystalline structure that generates an electro-optic effect when exposed to electrical fields. An electric field of the input signal modulates a second signal at a second frequency in the resonator via the electro-optic effect. A waveguide is optically coupled to the resonator and is configured to convey the modulated second signal away from the resonator.

A method for forming a transducer includes fabricating a resonator on a first substrate, resonant at a first frequency, by depositing a straining material on a resonator material to strain a crystalline structure of the resonator material to generate an electro-optic effect when exposed to electrical fields. A second substrate is fabricated with a cavity. The cavity has a diameter that supports whispering gallery modes at a second frequency. The second substrate is aligned over the first substrate such that a focusing structure in the microwave cavity aligns with the optical resonator.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide coupling between single-photon microwave signals and single-photon infrared/optical signals via the electro-optic effect using superconducting microwave and optical cavities. Each cavity incorporates an electro-optic material, with the electro-optic effect being induced by a straining material. Coupling takes place at the quantum level, with signal levels being about a single photon. The present embodiments may be implemented on one chip that may be fabricated using standard semiconductor fabrication processes.

Figure 1:
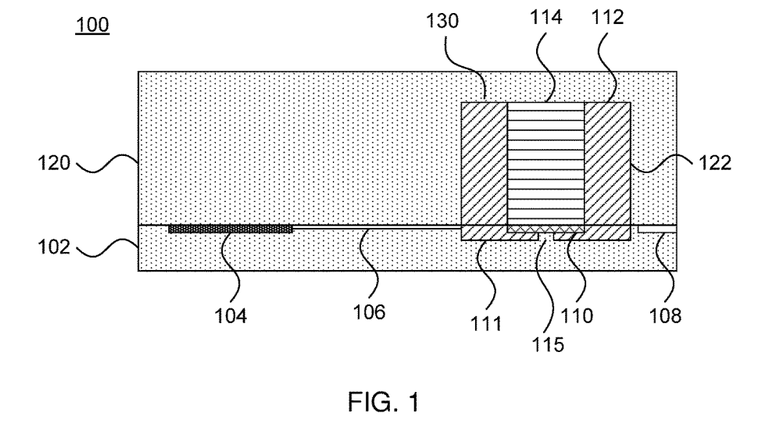
FIG. 1 is a cross-sectional diagram of a microwave-to-optical transducer in accordance with the present principles.

Referring now to the drawings in which like numerals represent the same or similar elements and initially to FIG. 1, a cross-sectional view of a microwave-to-optical transducer 100 is shown. A bottom substrate 102 is shown as having, e.g., a quantum computing device 104 (a "qubit") that provides, e.g., single-photon level microwave signals along a superconducting channel 106 to a transducing cavity 130. It is specifically contemplated that the bottom substrate 102 may be formed from silicon, but any other appropriate substrate material may be used in its place. After converting the microwave signal to an optical signal in the transducing cavity 130, the optical signal couples with a waveguide 108 and is transmitted to its destination. The cavity 130 is capacitively coupled to the superconducting channel 106, which may be either a microwave transmission line, or to other resonating structures (e.g., the qubit 104 itself).

A top substrate 120 includes a cylindrical cavity 112 and a central pin 114. In one embodiment, the cavity may have a radius of about 2.5 mm and the central pin 114 may have a radius of about 2 mm and a height of about 2 mm. It is specifically contemplated that the top substrate 120 may be formed from silicon, but any other appropriate substrate material may be used in its place. The sidewalls of the cavity 112 and the central pin 114 are coated with a superconducting film. The cavity 112 joins with a similar cavity 111 on the bottom substrate 102 to form a microwave resonator 122, which is connected to ground. The bottom cavity 111 has an exemplary depth of 0.67 mm and an exemplary radius of 1.98 nm. It should be noted that the top substrate 120 should not come into contact with the bottom substrate, at least in regions with superconducting films or the channel 106, to prevent damage to those structures. The central pin 114 approaches, without touching, an optical resonator 110 on a pedestal 115 in the bottom substrate 102. It is specifically contemplated that the optical resonator 110 is formed from silicon and silicon-germanium, with the silicon-germanium providing a strain on the silicon material. In one embodiment, the optical resonator 110 may have a radius of about 2 mm and a thickness of about 0.1 mm. This strain creates the electro-optic effect in the silicon as it deforms the crystalline structure of the silicon.

The integrated design of the present embodiments minimizes alignment errors between the optical resonator 110 and the waveguide 108 as the coupling between the optical resonator 110 and the waveguide 108 is defined by microfabrication. Such alignment errors would otherwise occur if the optical couplers were not integrated into the device, for example in systems that use prisms for coupling. In particular, in a cryogenic environment at millikelvin temperatures, misalignment errors due to different thermal expansion coefficients of the different materials can be reduced or avoided entirely.

During operation, microwave signals from the qubit 104 couple to the microwave resonator 122, where a standing wave forms on the outer and inner circumferences of the cavity, with strong fields at the boundaries and negligible field strength in the middle of the cavity. The superconducting film creates a low-loss resonator with a very high Q. At the junction of the central pin 114 with the optical resonator 110, the fields of the microwave modes modulate an optical signal in the optical resonator 110. With the aid of optical pump signals applied to the optical resonator, a microwave signal can be converted into an optical signal at a single photon level.

In one embodiment, the microwave resonator can be formed in an on-chip, transmission-line cavity or a coplanar waveguide cavity. A center pin or a high-voltage electrode of a transmission-line cavity or a coplanar waveguide cavity has a circular shape that can deliver a microwave signal to the optical resonator.

The optical resonator 110 may be formed in the shape of a disc, as shown, or as a ring, in both embodiments supporting whispering gallery modes at multiple frequencies. The diameter of the optical resonator 110 is selected to provide three modes at frequencies $\omega_{op}-\omega_q$ for a red-sideband, $\omega_{op}$ for a carrier, and $\omega_{op}+\omega_q$ for a blue-side band, with $\omega_q$ being the microwave frequency of the microwave resonator 122. In one embodiment, $\omega_{op}/2\pi$ may be about 193 THz (1550 nm wavelength) and $\omega_q$ may be about 10 GHz.

This embodiment may be achieved by choosing the free spectral range to be $\omega_q$, which is determined by the refractive index and diameter of the optical resonator 110. Using the sideband modes, a three-wave mixer is realized that couples microwave photons and optical photons.

Figure 2:
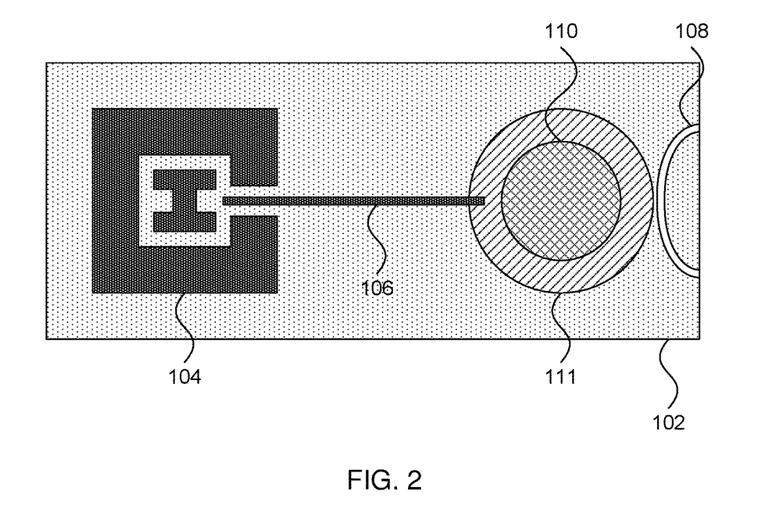
FIG. 2 is a top-down diagram of a portion of a microwave-to-optical transducer in accordance with the present principles.

Referring now to FIG. 2, a top-down view of the bottom substrate 102 is shown. The superconducting qubit 104 and the superconducting channel 106 are formed in or on the substrate 102. The lower cavity 111 is formed in the bottom substrate 102 by any appropriate process, including, e.g., micromachining or etching. A superconducting film is deposited over the internal surfaces of the lower cavity 111. The superconducting film may include, for example, aluminum, niobium, titanium, indium, or any other material or alloy that demonstrates superconducting properties in a desired temperature range. The superconducting film may be deposited by, e.g., sputtering or by thermal evaporation in a vacuum chamber. The optical resonator 110 is formed from, e.g., a saw-tooth silicon disc or ring with a layer of silicon-germanium to provide strain to the crystalline structure of the silicon, as described in further detail below. The optical waveguide 108 couples with the optical resonator 110 to transmit the optical signal off-chip and, in one embodiment, the optical waveguide 108 is positioned less than one micron away from the optical resonator 110 to promote coupling.

Figure 3:
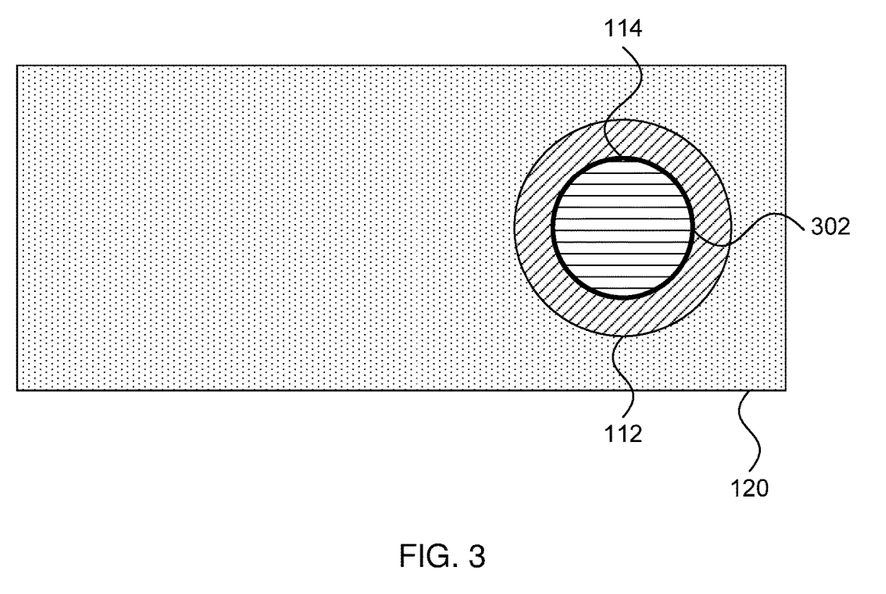
FIG. 3 is a bottom-up diagram of a portion of a microwave-to-optical transducer in accordance with the present principles.

Referring now to FIG. 3, a bottom-up view of the top substrate 120 is shown. The upper cavity 112 is formed in the top substrate 120 by any appropriate process, including, e.g., micromachining or etching. The central pin 114 is formed by the micromachining process as well, and a superconducting film is deposited over the surfaces of the upper cavity 112 and the central pin 114. A ridge 302 is formed along the outer edge of the facing circle of the central pin 114. The ridge 302 concentrates the fields of the whispering gallery modes along this edge for coupling with the optical resonator 110. The ridge 302 may be formed by any appropriate process, including, micromachining or etching. When the top substrate 120 is placed above the bottom substrate 102, the ridge 302 aligns with the outer edge of the optical resonator 110.

Figure 4:
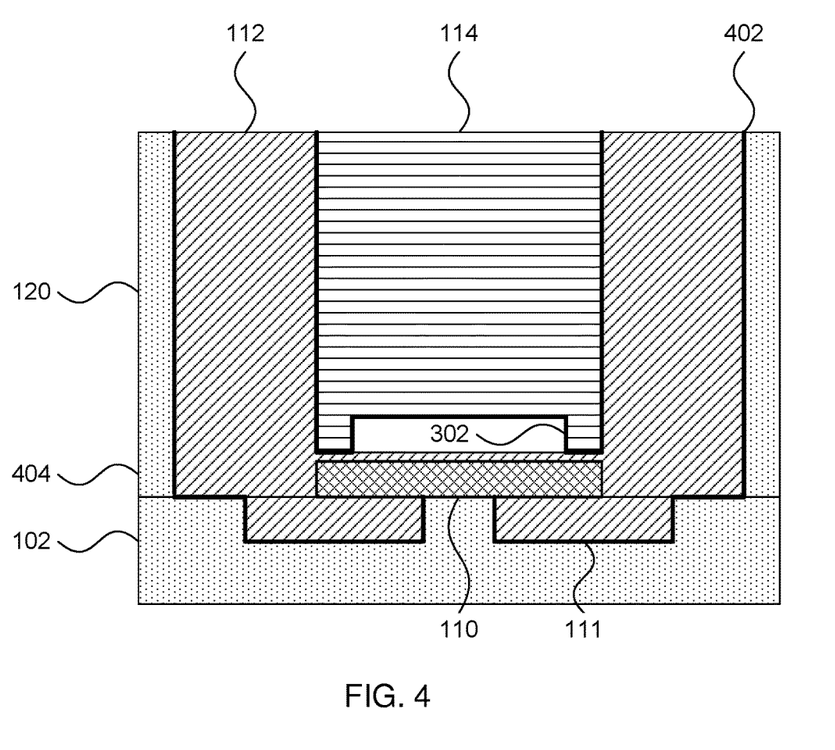
FIG. 4 is a detailed cross-sectional diagram of a portion of a microwave-to-optical transducer in accordance with the present principles.

Referring now to FIG. 4, a more detailed cross-sectional view of the connection between the pin 114 and the optical resonator 110 is shown. The ridge 302 is positioned slightly above the optical resonator, with small gap between the two structures to prevent plasmonic loss of the optical signal through the superconducting film. A small portion internal portion of the face of the central pin 114 is cut away, with a cutaway depth of about 0.5 mm and a cutaway radius of about 1.9 mm. In addition, superconducting surfaces 402 are shown with a heavier line weight, having had a superconducting film deposited on them.

It should be noted that the central pin 114 is also recessed with respect to the sidewalls of the cavity 112. The depth of the recess provides room for the optical resonator 110 as well as a small additional gap to prevent plasmonic modes between the pin 114 and the resonator 110. The cavity 112 and gap may be filled with air or may be in a vacuum or an appropriate inert gas.

It is to be understood that the present invention will be described in terms of a given illustrative architecture having a wafer; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
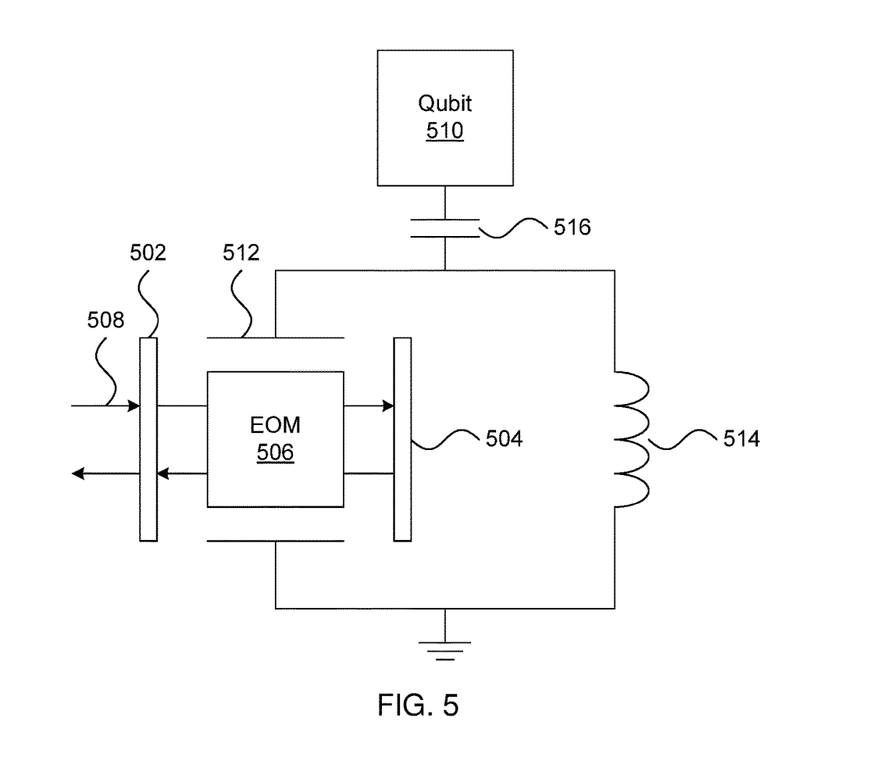
FIG. 5 is a schematic diagram of a microwave-to-optical transducer in accordance with the present principles.

Referring now to FIG. 5, an abstract diagram of electro-optic modulation of an optical carrier is shown. An optical beam 508 is shown passing through semi-transparent, partially mirrored plate 502, through an electro-optic modulator (EOM) region 506, and reflecting from a mirror 504. The mirrors 502 and 504 form a Fabry-Perot cavity. In the present embodiments, the EOM region 506 is a resonator at the optical wavelengths. An inductor 514 and the plates of capacitor 512 form a resonator at a microwave frequency, with the output of qubit 510 being injected into the resonator through capacitor 516. As the microwave signal oscillates in the resonator, charges build and switch on capacitor plates 512 around the EOM region 506. These charges create an oscillating electric field that causes a phase shift in the optical signal.

The phase shift is caused by a change in the refractive index in the EOM 506 caused by the external electric field, $E_j$. This change is characterized as:

$$\Delta n = -\tfrac{1}{2} n^3 r_{ij} E_j$$

where n is the refractive index of the medium of the EOM 506 and $r_{ij}$ is the electro-optic coefficient. The phase shift is characterized as:

$$\Delta \phi = \Delta k L = \frac{\omega_a}{c/\Delta n} L$$

where L is the inductance of inductor 514 and $\omega_a$ is the frequency of the optical signal. A change in the frequency is characterized by:

$$\Delta \omega_a = \frac{\Delta \phi}{\tau} = \frac{\omega_a}{c/\Delta n} \frac{L}{\tau} = \omega_a \frac{\Delta n}{n} = -\frac{1}{2}\omega_a n^2 r_{ij} E_j$$

where $\tau$ is the optical round-trip time and c is the speed of light. The indices i and j are the indices of the electro-optic material crystal axis.

This embodiment specifically makes use of the Pockels effect, where the resonant frequency of the optical resonator 110 is modulated using the microwave field from the microwave cavity 112. The electro-optic effect is caused in the optical resonator 110 by depositing a straining material that breaks the crystal symmetry of a substrate. The coupling between the microwave signal and the optical signal is described by a coupling Hamilton:

$$\hat{H}' = \hbar g (\hat{b}^+ + \hat{b})(\hat{a}_-^+ + \hat{a}^+ + \hat{a}_+^+)(\hat{a}_- + \hat{a} + \hat{a}^+)$$

where $\hat{a}_-(\hat{a}_-^+)$, $\hat{a}(\hat{a}^+)$, and $\hat{a}_+(\hat{a}_+^+)$ are the annihilation (creation) operators for red-sideband, carrier, and blue-sideband modes in the optical cavity 110 respectively, $\hat{b}(\hat{b}^+)$ is the annihilation (creation) operator for the microwave photons of the qubit 104, and g is the coupling strength between the optical and microwave photons. After applying the rotating-wave approximation, the Hamiltonian $\hat{H}=\hat{H}_0+\hat{H}_C$ of the electro-optic device 100, including the red- and blue-sideband modes, becomes:

$$\hat{H}_0 = \hbar \omega_- \hat{a}_-^+ \hat{a}_- + \hbar \omega_{op} \hat{a}^+ \hat{a} + \hbar \omega_+ \hat{a}_+^+ \hat{a}_+ + \hbar \omega_q \hat{b}^+ \hat{b}$$

$$\hat{H}_C = \hbar g(\hat{a}_-^+ \hat{a}\hat{b}^+ + \hat{a}_- \hat{a}^+ \hat{b} + \hat{a}_+^+ \hat{a}\hat{b} + \hat{a}_+ \hat{a}^+ \hat{b}^+)$$

where $\omega_{op}$ is the optical carrier frequency, $\omega_-$ and $\omega_+$ are the red and blue sideband frequencies, and $\omega_q$ is the microwave frequency of the qubit 104.

The coupling Hamiltonian, $\hat{H}_C$, shows the three-wave mixing among the optical photons at the carrier and the sidebands and the microwave photons of the superconducting qubit 104. By applying a strong pump tone at $\omega_+ = \omega_{oR} + \omega_q$, the operators $\hat{a}^+$ can be replaced by the classical drive $\alpha^+$ (c-number), where $|\alpha^+|^2$ represents the average number of pump photons at $\omega^+$, which provides an effective coupling rate between the quantum microwave node $\hat{b}$ and the fundamental optical mode $\hat{a}$ at a rate $\Omega_R = g|\alpha_+|$. In one embodiment, with realistic parameters, this rate may be about 10 MHz, with a coupling strength of g~10 kHz and $\alpha$=1000 corresponding to $10^6$ photons in the resonators. This sets an upper bound on the speed of the communication channel. In general the coupling strength can be estimated as:

$$\frac{g}{2\pi} \equiv -\frac{1}{2} f_a n^2 r \frac{V_{ZPV}}{d} \sim 0.1 - 100 \text{ kHz}$$

where $V_{ZPV}$ is the superconducting cavity zero-point voltage (having a range of about 0.1 µV to about 1 µV), d is the thickness of the optical resonator 110 (having a range of about 1 µm to about 100 µm), $f_a$ is an optical communications frequency (e.g., about 193 THz), n is the number of pump photons, and r is the electro-optic coefficient of the electro-optic material. It should be noted that the pump signal can be provided through the optical waveguide 108 described above.

Figure 6:
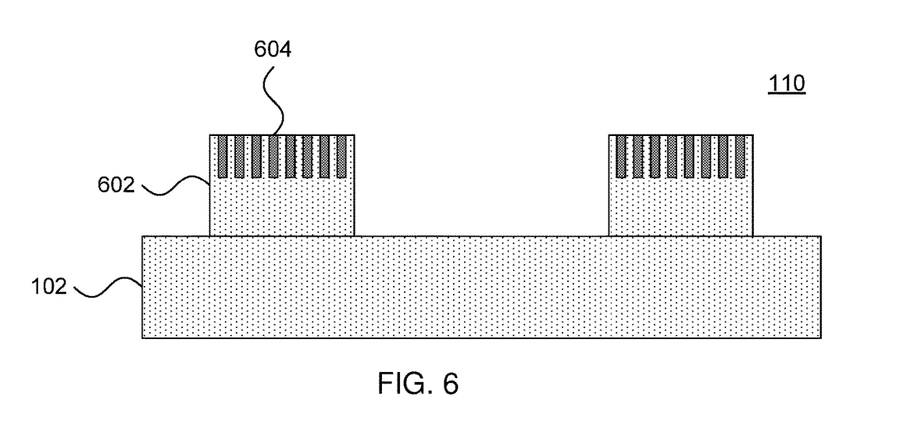
FIG. 6 is a detailed cross-sectional diagram of a strain-induced electro-optic optical resonator in accordance with the present principles.

Referring now to FIG. 6, a cross-sectional view of detail on the structure of an optical resonator 110 is shown. The substrate 102 has a ring 602 of additional material, e.g., silicon, formed on it. The material of the ring 602 is patterned on a top surface, with another material 604, e.g., silicon germanium, being deposited in the gaps. The additional material 604 is selected to have a different lattice structure than that of the ring 602, which causes a strain in the lattice structure of the ring 602. It is this strain that makes the ring 602 susceptible to the electro-optic effect. The straining material 604 may deposited by any appropriate deposition process including, e.g., chemical vapor deposition, physical vapor deposition, and atomic layer deposition.

It is contemplated that other embodiments of an optical resonator 110 may be employed. As noted above, the ring 602 is only one structure, and a disc embodiment may be used instead as long as it supports whispering gallery modes at the optical frequencies in question. In addition, different materials may be used. The above-described embodiment uses strain in the crystalline lattice structure of the resonator 110 to create the Pockels electro-optic effect, but it should be noted that some materials that naturally lack crystalline inversion symmetry also exhibit this effect and may be used instead. The optical resonator 110 may be formed by any appropriate fabrication technique, including machining, micro-fabrication, etching, etc.

Figure 7:
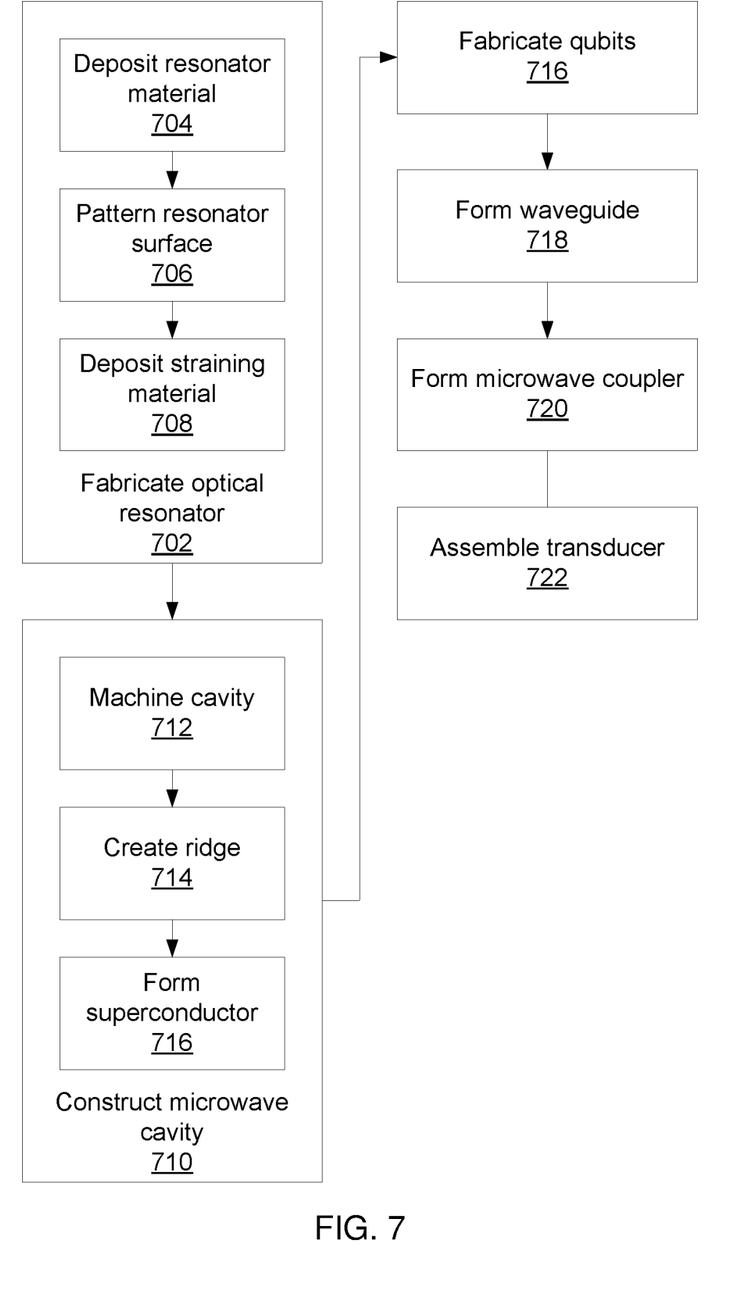
FIG. 7 is a block/flow diagram of a method of fabricating a microwave-to-optical transducer in accordance with the present principles.

Referring now to FIG. 7, a method of forming a microwave-to-optical transducer is shown. Block 702 fabricates the optical resonator 110. In particular, block 702 forms the optical resonator in or on the bottom substrate 102 by, e.g., depositing resonator material in block 704 (or, alternatively, etching the resonator material from the bulk substrate 102), patterning the resonator surface in block 706 as described above to form ridges, and depositing a straining material 604 in block 708 to create a strain in the crystalline structure of the optical resonator 110. Alternatively, block 702 can fabricate the optical resonator 110 from a material that naturally exhibits the electro-optic (Pockels) effect.

Block 710 constructs the microwave cavity in the top substrate 120. Block 712 machines the microwave cavity 112 in the top substrate 120 by any appropriate microfabrication technique, including micro-machining or etching. The microwave cavity 112 may be, for example, a microwave coaxial cavity (as shown above), a microwave coplanar waveguide, a microwave microstrip cavity, etc., and is formed with a smooth internal surface at a diameter that supports whispering gallery modes at the microwave frequency of the qubit 104. Block 714 forms the ridge 302 on the face of the central pin 114 by, e.g., machining the surface of the pin 114 or by an etching process to concentrate the electric fields of the microwave signal onto the optical resonator 110. Block 716 forms a superconducting film over the internal surface of the microwave cavity 112 and the outer surface of the central pin 114.

Block 716 fabricates the qubit(s) 104 on the lower substrate 102. It should be noted that the qubit(s) 104 may be made with superconducting material and may be integrated with the same substrate 102 as described above, or may be formed in a separate package and subsequently connected or attached to the device.

Block 718 forms a waveguide in, e.g., the bottom substrate 102, that couples to the optical resonator 110 and provides communication of modulated signals from the optical resonator 110 to other devices on- or off-chip. Block 720 forms a superconducting coupling path 106 that couples the qubit(s) 104 to the microwave electric fields in the microwave cavity 112. The coupling path may include, e.g., a microwave antenna or superconducting channel. Block 722 assembles the transducer, placing the top substrate 120 over the bottom substrate 102 and aligning the central pin 114 of the microwave cavity 112 above the optical resonator 110, such that electric fields from the whispering gallery modes on the central pin 114 are applied to the optical resonator 110.

Figure 8:
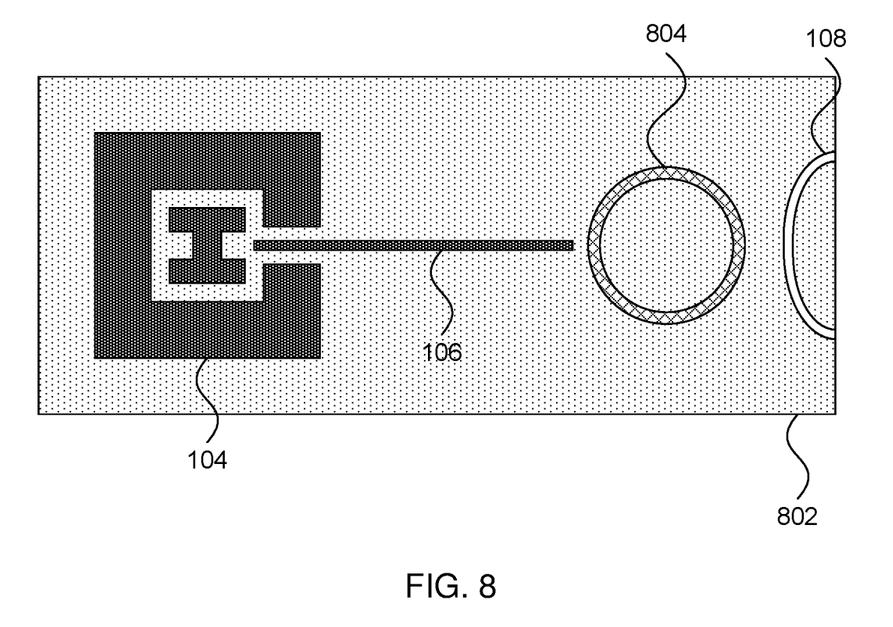
FIG. 8 is a top-down diagram of a portion of an alternative microwave-to-optical transducer in accordance with the present principles.

Referring now to FIG. 8, a top-down view of an alternative bottom substrate 802 is shown. The qubit 104, superconducting channel 106, and waveguide 108 are shown as being placed similarly to the embodiment of FIG. 2. However, instead of having a lower cavity 111 with the optical resonator 110 being placed over top, this embodiment has a ring optical resonator 804 placed directly on the bottom substrate 802 with no lower cavity at all. This embodiment may alternatively have a disc oscillator as the optical resonator 804.

Figure 9:
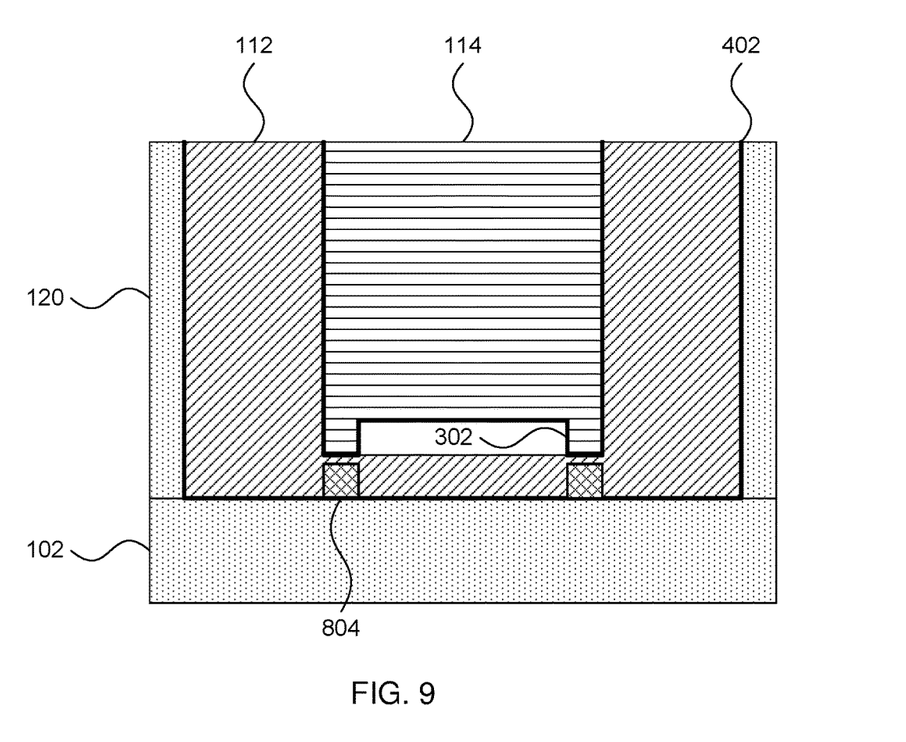
FIG. 9 is a detailed cross-sectional diagram of a portion of an alternative microwave-to-optical transducer in accordance with the present principles.

Referring now to FIG. 9, a more detailed cross-sectional view of the connection between the pin 114 and the optical resonator 804 is shown. As can be seen, the resonator 804 rests directly on the bottom substrate 102 and is shown in cross section directly under the ridge 302.

Having described preferred embodiments of an integrated microwave-to-optical single-photon transducer (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A transducer, comprising:
    a substrate having a cavity with a diameter that supports whispering gallery modes at a frequency of an optical input signal;
    a focusing structure in the cavity; and
    an optical resonator directly under the focusing structure, having a crystalline structure that generates an electro-optic effect when exposed to electrical fields, wherein at a junction of the focusing structure with the optical resonator, an electrical field of the optical input signal modulates an optical output signal in the optical resonator via the electro-optic effect.

2. The transducer of claim 1, wherein the cavity is cylindrical and the focusing structure is a center pin that is coaxial with the cavity.

3. The transducer of claim 1, further comprising a superconducting film that is formed directly on an inner surface of the cavity and on an outer surface of the focusing structure.

4. The transducer of claim 1, wherein the optical resonator is formed from a first material having grooves in a top surface with a second material formed in the grooves, wherein the second material creates a strain in a crystalline structure of the first material to generate the electro-optic effect in the optical resonator.

5. The transducer of claim 4, wherein the optical resonator comprises an optical disc structure.

6. The transducer of claim 4, wherein the optical resonator comprises an optical ring structure.

7. The transducer of claim 1, wherein the focusing structure is a cylindrical pin comprising a surface facing toward the optical resonator, the surface having a ridge along an outer circumference.

8. The transducer of claim 1, further comprising another cavity underneath the optical resonator having a same diameter as the cavity in the substrate.

9. The transducer of claim 1, wherein the cavity is resonant with whispering gallery modes at a microwave frequency and the optical resonator is resonant at an optical frequency.

* * * * *